Jan. 12, 1943.    W. A. BISHMAN ET AL    2,308,046
APPARATUS FOR FORMING RECEPTACLES
Filed Dec. 23, 1939    4 Sheets-Sheet 1

Inventors
Walter A. Bishman
Harold G. Lien
By Williamson & Williamson
Attorneys

Jan. 12, 1943.   W. A. BISHMAN ET AL   2,308,046
APPARATUS FOR FORMING RECEPTACLES
Filed Dec. 23, 1939   4 Sheets-Sheet 2
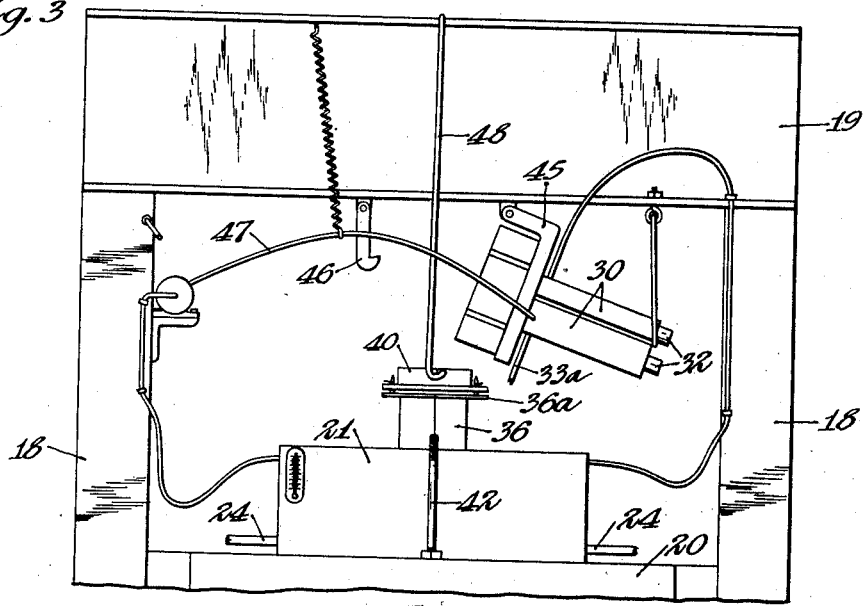
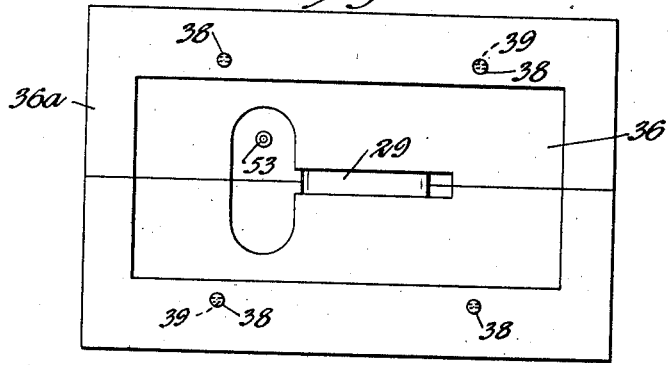
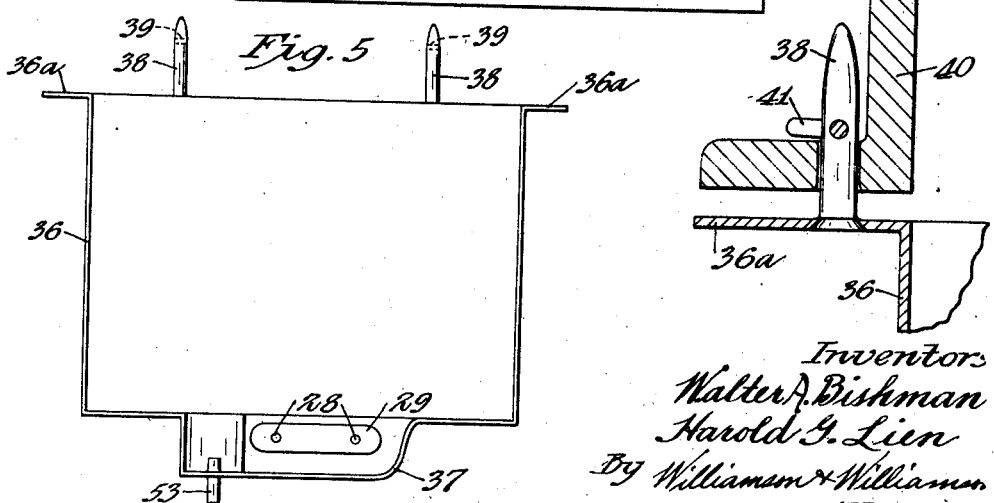
Inventors
Walter A. Bishman
Harold G. Lien
By Williamson & Williamson
Attorneys

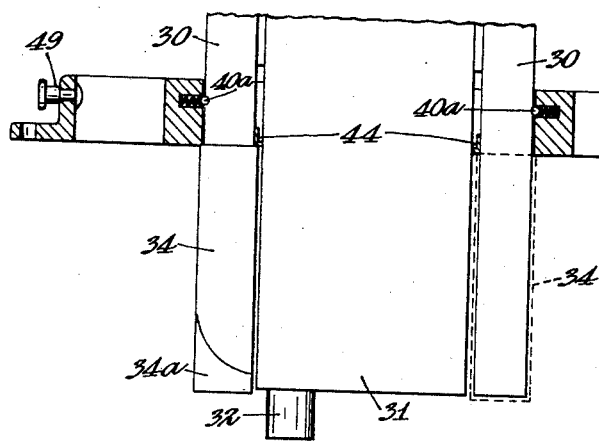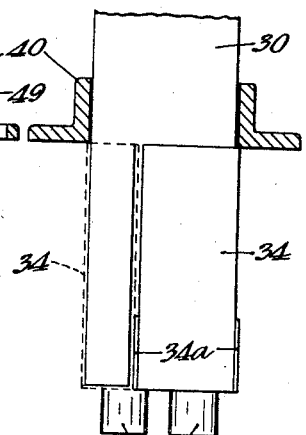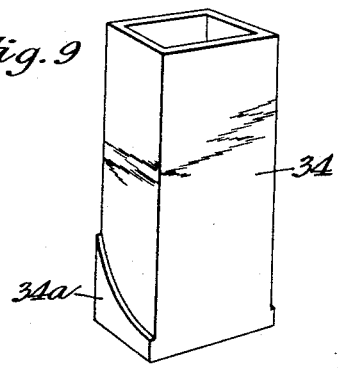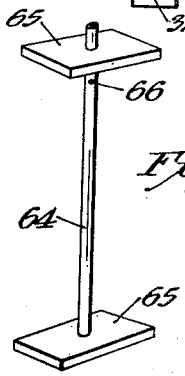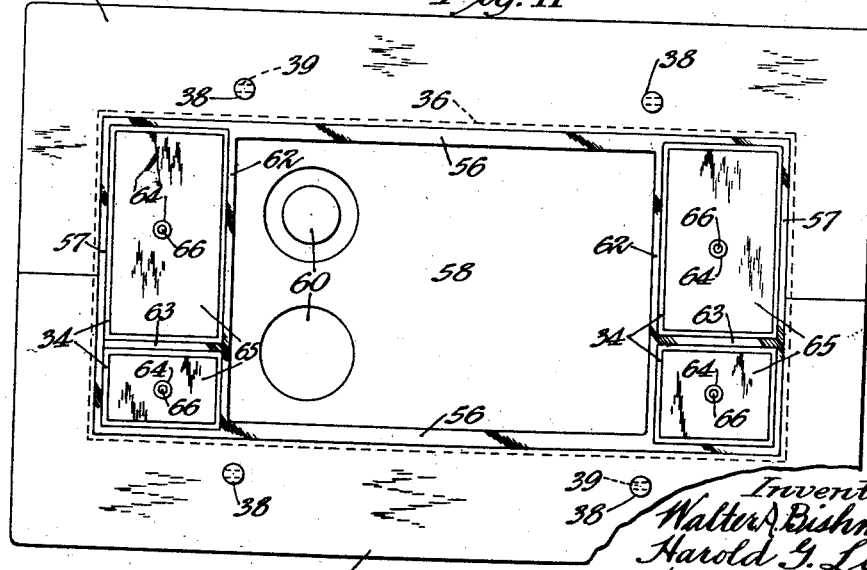

Jan. 12, 1943.   W. A. BISHMAN ET AL   2,308,046
APPARATUS FOR FORMING RECEPTACLES
Filed Dec. 23, 1939   4 Sheets-Sheet 4
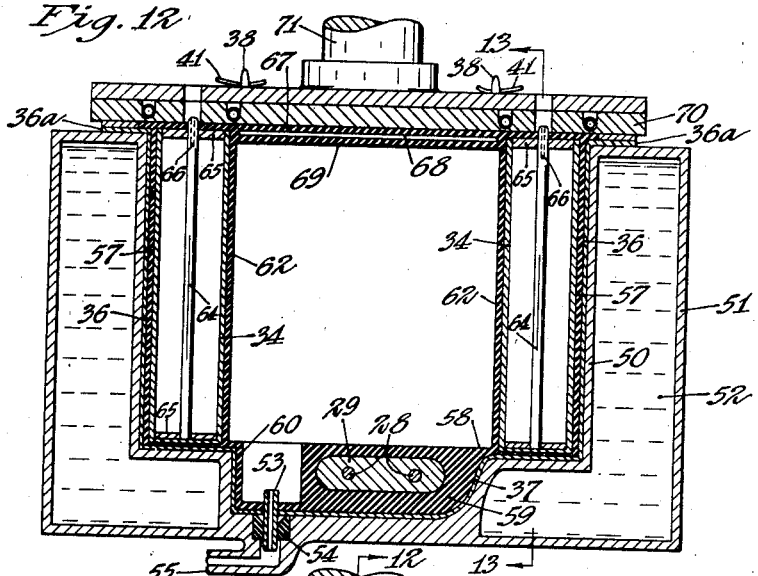
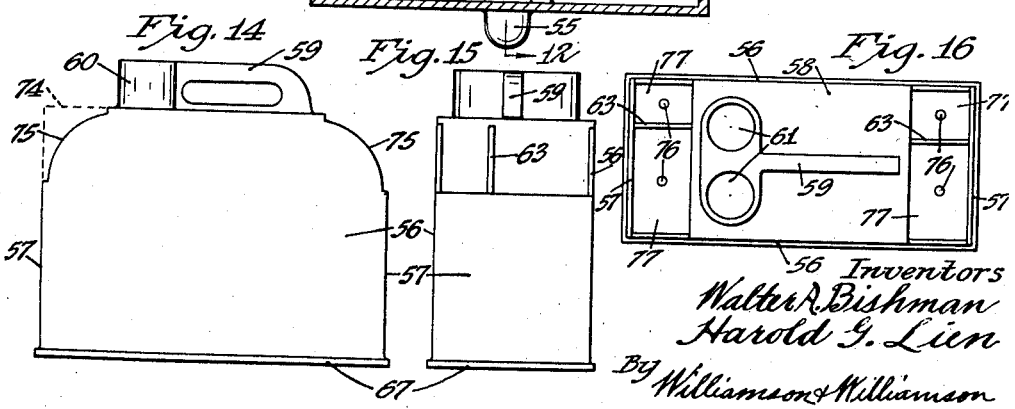
Inventors
Walter A. Bishman
Harold G. Lien
By Williamson & Williamson
Attorneys Patented Jan. 12, 1943

2,308,046

UNITED STATES PATENT OFFICE 2,308,046

APPARATUS FOR FORMING RECEPTACLES

Walter A. Bishman and Harold G. Lien,
Minneapolis, Minn.

Application December 23, 1939, Serial No. 310,702

1 Claim. (Cl. 18—34)

This invention relates to container structures and to the method and apparatus for manufacturing the same.

Many types of devices have heretofore been molded from rubber and vulcanized to properly condition the rubber for use. One of the usual types of apparatus is a pressure mold which is heated and in which the rubber is placed to be pressed into the desired shape. The degree of heat required for the pressing operation is not great and the articles must be subjected to considerably higher temperatures after the pressure molding operation in order to vulcanize them. When this has been done in the same mold, it is necessary to either successively mold a plurality of articles under the desired pressures at a relatively low temperature and then raise the mold temperature for successive vulcanizing operations or to form each article at the lower temperature under pressure and then raise the mold temperature sufficiently to produce vulcanization in each individual case. Neither of these molding procedures is practical from the standpoint of time wasted in increasing and reducing the mold temperatures.

In the formation of substantially closed articles such as containers for liquids, the apparatus heretofore used is such that it is relatively difficult to utilize a core within the container and satisfactorily provide means for removing the same without producing a disfiguring seam and without requiring additional and cost increasing operations.

It is an object of our invention to provide a method of forming rubber articles wherein no time is lost between the relatively low temperature pressing operation and the comparably high temperature vulcanizing operation.

Another object of the invention is to provide a method for forming substantially closed containers wherein the articles can be produced with relative ease and speed, and wherein the use of an internal core during at least a part of the operation is eliminated.

Another object of the invention is to provide a method for forming articles having open compartments and at least one closed compartment wherein no difficulty is encountered in supporting the walls of the article during vulcanization of the closed compartment portion.

Still another object of the invention is to provide apparatus for forming such articles wherein the pressure forming and vulcanizing operations can be carried on with facility and speed.

A more specific object of the invention is to provide core structures, portions of which can be removed after the pressure molding, and portions of which are retained for the vulcanization of the articles so that the walls thereof will be positively retained in their proper form.

Still a further object of the invention is to provide a rubber container including a substantially closed receptacle portion and one or more open ended compartments in accordance with the method herein set forth and the apparatus disclosed.

These and other objects and advantages of the invention will more fully appear from the following description made in connection with the accompanying drawings, wherein like reference characters refer to the same parts throughout the views, and in which:

Fig. 3 is a side elevation of the upper portion of the apparatus shown in Fig. 1, with the formed article in the process of removal from the mold;

Fig. 4 is a plan view of a molding shell in the inverted position in which it is placed in the forming and vulcanizing molds;

Fig. 5 is a side elevation of one-half of said shell;

Fig. 6 is a fragmentary section showing an upper corner of the molding shell and its means of connection with the shell puller or mold stripper;

Fig. 7 is a side elevation of the composite core, showing one core sleeve in full and another in dotted lines and a section through the stripper frame;

Fig. 8 is an end elevation of the structure shown in Fig. 7;

Fig. 9 is a perspective view of one of the core sleeves;

Fig. 10 is a perspective view of a core sleeve insert;

Fig. 11 is a plan view of the molding shell with the pressed article partially formed therein and with the sleeve inserts in position;

Fig. 12 is a longitudinal section through the vulcanizing mold with the article therein;

Fig. 13 is a section taken approximately on the line 13—13 of Fig. 12;

Fig. 14 is a side elevation of the finished article;

Fig. 15 is an end view thereof, and

Fig. 16 is a plan view of the article.

Figure 1:
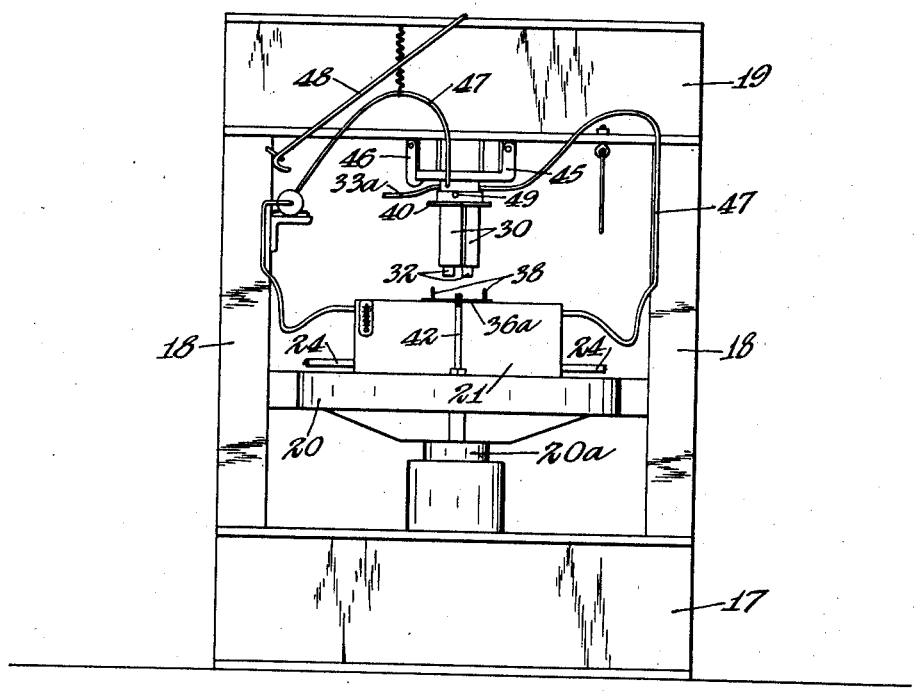
Fig. 1 is a side elevation of a pressure mold and cores in general.
Figure 2:
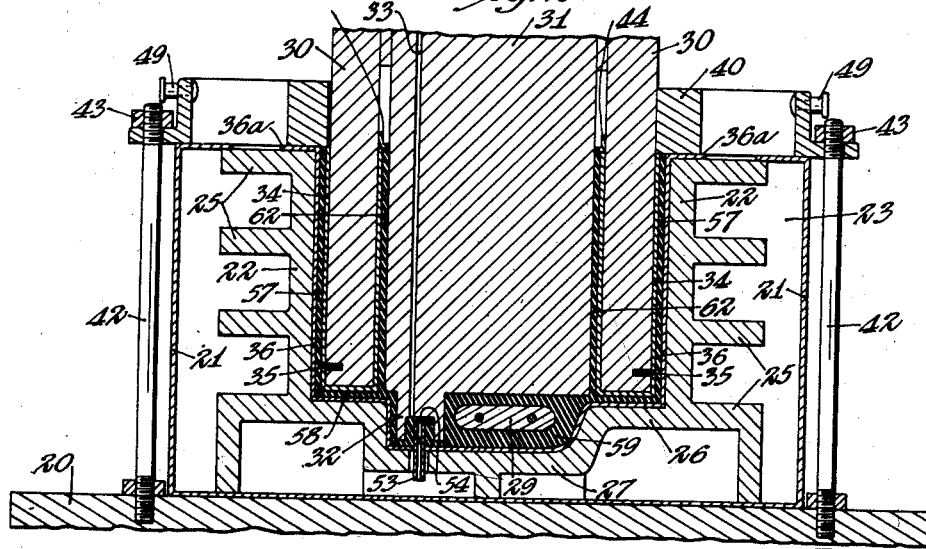
Fig. 2 is an enlarged longitudinal section through the mold and cores with a partially completed article shown therein.

In Fig. 1 there is shown pressure molding apparatus including a base 17, uprights 18, and a top cross member 19. A table 20 is mounted for vertical movement upon a piston 20a which is preferably hydraulically operated by means of a suitable pump, not shown since it is well understood in the molding art. Mounted upon the table 20 is a mold having outer walls 21 which, as best shown in Fig. 2, are spaced from the main mold walls 22 which the outer walls enclose. The space 23 between the walls provides a hot water jacket, and the heated liquid is admitted to and removed from the water jacket by means of suitable pipes 24 which are conveniently connected to some source of hot water which may be circulated by means of a pump or convection. The individual mold walls 22 are provided with heat exchange fins 25 to more readily take up the heat from the water in the jacket space 23. The mold bottom 26 is provided with a central depressed portion or pocket 27 which in this particular case is provided to assist in the formation of the handle of the container. Removably supported by pins 28 is a block 29 which lies in and is spaced from the walls of the handle pocket 27 to form the handle opening. The pins 28 rest in notches in the side walls of the handle depression 27 so that the block 29 is removable with the plastic article being produced.

The core unit comprises a plurality of end compartment formers 30 and a central compartment element 31. The central core element has a pair of downwardly extending portions 32 which, as shown in Fig. 2, extend down below the principal inner bottom surface of the mold nearly to the bottom of the handle pocket 27. A vertical air passage 33 is provided through at least the large central core portion 31 to permit the introduction of air under pressure from a suitable line 33a (Fig. 1) when the core is pulled from the molded article in the forming mold.

The end compartment formers or core units 30, as best shown in Figs. 2, 7 and 8, extend downwardly distances slightly less than the main bottom face of the central core unit 31 and on these end units 30 are positioned core sleeves 34 which are normally retained on the core sections by means of spring pressed balls 35, as best illustrated in Fig. 2. The spring balls are adapted to seat in shallow pockets on the inner walls of the sleeve elements so that they can be slipped from the end core units 30 in a manner to be described.

Fitting immediately within the inner walls 22 of the forming mold is a mold shell 36 which, as shown in Figs. 4 and 5, is formed in two sections, and the bottom of the shell, as viewed in Figs. 2 and 5, is provided with a handle depression or pocket 37 which fits in the similarly shaped pocket 27 in the bottom of the forming mold. The mold shell 36 at its open or upper edge is provided with a horizontally extending flange 36a and a plurality of pins 38 having transverse apertures 39 extend upwardly from the flange 36a. The flange is adapted to rest upon the top surface of the forming mold, as best illustrated in Fig. 2, and the pins 38 extend upwardly through suitably positioned openings in a combined sleeve stripping and shell pulling frame 40. This is shown in the detail in Fig. 6. Removable wires 41 are positioned through the openings 39 in the pins 38 for reasons to be explained. The frame 40 in Fig. 2 is shown secured by means of long vertical bolts 42 to the table 20 so that when the nuts 43 are secured on the bolts 42, the stripper frame 40 and mold shell 36 are held firmly within the walls 22 of the forming mold. The open central portion of the frame 40 is crossed by a pair of small angle irons 44 which lie between the central core element 31 and the end core elements 30. These cross members 44 overlie end portions of the core sleeves 34 and portions of the main stripper frame 40 overlie outer and upper end portions of said core sleeves 34.

The core assembly is supported, as shown in Figs. 1 and 3, by a hinged bracket 45 which is retained in a horizontal position above the mold by a pivoted catch 46, and it is preferred that all of the mold cores be made hollow to permit the circulation of hot water which is supplied and taken off by suitable conduits 47. The conduits 47 are flexible and long enough so that the catch 46 can be operated to release the mold cores 30 and 31 on their hinged support 45 to permit said cores to be swung to the position shown in Fig. 3 for removal of the molded article in the mold shell 36. The shell and molded article are removed by disconnecting the stripper 40 from the long vertical bolts 42 and positioning the elongated hooks 48, as shown in Fig. 3, beneath short pins 49 on said stripper. Since the mold shell 36 is connected to the stripper frame 40 by means of the pins 38 which project through the stripper frame and are held by wires 41, as shown in Fig. 6, said mold shell and the formed article will be withdrawn from the mold when the mold 21 and table 20 are drawn downwardly by action of the hydraulic piston 21. The stripper frame 40 may, as shown in Fig. 7, be releasably connected to certain of the end core sections 30 by means of spring pressed balls 40a so that said stripper frame can be maintained in proper position during assembly of the apparatus.

When the molding operation is begun, a predetermined amount of rubber which has been treated to permit vulcanization thereof is placed in the mold shell 36 which has previously been put in position within the mold walls 22. The handle opening block 29 is also placed in position prior to introduction of the rubber. The stripper frame 40 is slipped over the mold cores 30 and 31 and the end core sleeves 34 are then slipped up over the core sections 30. The apparatus is in the condition shown in Fig. 1. The table 20 is then raised by means of the hydraulic piston 20a and the action of the mold and cores coming together under considerable pressure and accompanied by relatively low temperature, which in this instance may be approximately 170 degrees, the rubber will be flowed to describe the general shape shown in Fig. 2. When the mold has been pressed upwardly a sufficient distance to insure proper formation of the rubber article, the stripper frame 40 is connected to the vertical bolts 42 and the table 20 is then lowered. This will cause the removal of the mold cores 30 and 31, but will leave the core sleeves 34 in the end compartments formed in the rubber receptacle. The stripper 40 having been connected to the mold shell 36 by means of the pins 38 and wires 41, the pivot hooks 48 are swung beneath the pins 49 extending horizontally from the ends of the stripper frame 40 after a second elevation of the table 20, and the table is again lowered to pull the stripper frame 40 and the mold shell 36 with the partially formed rubber article therein, the core sleeves 34 remaining in the compartments which they have formed. The article was then ready for transfer to the vulcanizing mold.

This mold comprises an inner mold casing 50 which is shaped to receive the mold shell 36 and said mold 50 is surrounded by a jacket 51 to provide a hot water space 52 which is suitably supplied by the heated liquid from a suitable source.

It will be noted in Fig. 2 that a small tube 53 extends downwardly through the bottom of the forming mold in the handle depression, and in said forming mold the tube 53 has its upper end closed by a removable headed pin 54. When the article and the mold casing are removed from the forming mold, the pin 54 is withdrawn from the tube 53, and when the shell and molded article are placed in the vulcanizing mold, the tube 53 extends through a rubber collar 54 which is mounted in the end of an air conduit 55. It is preferred that some type of valve arrangement be provided in conjunction with the sealing collar 54 so that the air conduit is normally closed until the tube 53 is placed in the position shown in Fig. 12. However, the flow of air through the conduit 55 may be controlled by a valve at some convenient point adjacent the mold. This air connection is provided to permit the introduction of air under pressure to the interior of the large central compartment in the article so that its walls will be held outwardly and will not collapse during the vulcanizing operation, which would occur if the vulcanization was carried on with the central mold core 31 removed, as is done in carrying out my method.

The rubber article at this point has been formed complete except for the bottom. The side walls 56 and end walls 57, as well as the central compartment top 58 and handle 59, were formed in the pressure or forming mold. At the same time the pressure mold also forms an upstanding neck 60 in the top of which a pair of openings 61 are subsequently cut. Partitions 62 were also formed between the central core member and the end members in the forming mold, as were partitions 63 which form two end compartments at each end of the central receptacle portion. The bottom of the receptacle is merely placed upon the inverted and partially formed article after the sleeve inserts have been placed in the core sleeves 34. These inserts comprise vertically disposed rods 64 and rectangular end pieces 65. The end pieces are of a size to relatively closely fit within the ends of the core sleeves 34, and it is preferred that the upper portion of each of the vertical rods 64 be provided with air escape vents 66.

The bottom of the container is formed of a flat rectangular sheet of unvulcanized rubber 67, and to re-enforce the same a wire 68 is placed centrally and longitudinally of the bottom of the closed compartment portion with a strip of rubber 69 pressed thereover. The inverted bottom edges of the side walls and partitions of the container are folded over before the application of the container bottom 67 to form a more perfect union between said edges and said bottom. Then the vulcanizing presser plate 70, which is connected to a suitable piston 71, is pressed down upon the container bottom and the edges of said container bottom are tightly pressed between the flange 36a of the mold shell 36, and a rubber article is subjected for a predetermined length of time to the relatively high vulcanizing temperatures of said vulcanizing mold. The plunger 71 is then drawn up and the mold shell with the rubber article is removed from the vulcanizing mold. This removal is accomplished by running short wires 41 through the upright pins 38 which, as before explained, extend upwardly at various points from the flange 36a on the mold shell 36.

When the article is removed from the vulcanizing mold, the mold shell is slipped off, said shell being formed in two pieces, as indicated in Figs. 4, 5 and 11. The handle opening block 29 can then be slipped out of the opening which it has formed. The molded article is then placed in an upright position and top and side end portions of the container, indicated at 74 in Fig. 14, are cut away to permit removal of the core sleeves 34.

It will be seen in Figs. 7, 8 and 9 the core sleeves have projecting corner portions 34a which produce the curved formation of the container corner portions 75 since they extend laterally to the inner walls of the mold shell during the pressure forming operation. At this time the openings 61 are cut in the projecting top portion 60 of the container.

Openings 76 are formed in the bottom of the open topped end compartments 77 by the upper ends of the vertical rods 64 which, as shown in Figs. 10, 12 and 13, extend above and through the bottom 67 in the vulcanizing mold.

The article illustrated in Figs. 14 through 16 is particularly adapted for use as a battery service kit, the closed central compartment being adapted to contain distilled water for storage batteries and the two circular openings 61 in the top of said compartment being intended to receive and support a hydrometer and a syringe. The end compartments 77 are adapted to carry a plurality of battery service tools, and the openings 76 in said end compartments permit the drainage of any water which might accidentally get into them. The wire re-enforced bottom portion which forms the bottom of the water compartment gives the same sufficient strength to prevent it from bulging downwardly when the kit is being carried, and it will be seen in Fig. 11 that the side wall portions of the article are thicker where they enclose the water compartment side walls to re-enforce the same against bulging.

From the foregoing description it will be seen that I have provided a method for forming rubber articles, and particularly rubber containers wherein they can be formed under pressure with a relatively low degree of heat and immediately vulcanized by transferring them with my improved core apparatus to a vulcanizing mold where they are subjected to higher temperatures incident to vulcanization. The forming mold can therefore be maintained at a constant relatively low temperature and the vulcanizing mold can be kept at its required higher temperature, whereas the temperature would constantly have to be changed after the molding and vulcanizing were done in the same piece of apparatus. The mold core structure provides efficient means for forming both closed and open compartments in the same article and the provision of air under pressure in the water compartment during vulcanization effectively supports the water compartment walls even though the forming core therefor has been removed.

The article itself is for all practical purposes formed in one piece and the single seam required between the side walls and the bottom cannot be detected after the article has been removed from the vulcanizing mold. The material from which the article is made is such that it will not break or become sprung and leak if it is handled roughly, and it will not damage the finish to motor vehicles if it is placed upon the finish or knocked against it during the servicing operation. The water compartment and handle are symmetrically placed centrally of the article and it will, therefore, remain in proper balance when being carried.

It will, of course, be understood that various changes may be made in the form, details, arrangement and proportions of the parts of the apparatus and the article, and alterations may be made in the steps of the method without departing from the scope of my invention.

What is claimed is:

Apparatus for forming plastic articles comprising, a forming mold, a composite core comprising, a relatively solid core section, and a removable core sleeve fitted over said solid section, said composite core being insertable in said mold to produce the shape of the article, means for withdrawing said solid core section, and means for retaining said core sleeve in the article formed during withdrawal of said solid section, said sleeve retaining means comprising a stripper element connected to the mold and in engagement with said sleeve, and said stripper being positioned out of the line of movement of said core when said core is removed.

WALTER A. BISHMAN.
HAROLD G. LIEN.